US008896532B2

(12) United States Patent
Lim

(10) Patent No.: US 8,896,532 B2
(45) Date of Patent: Nov. 25, 2014

(54) INTERACTIVE DISPLAY DEVICE AND CONTROL METHOD THEREOF

(75) Inventor: Seijun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 237 days.

(21) Appl. No.: 13/478,142

(22) Filed: May 23, 2012

(65) Prior Publication Data
US 2013/0285896 A1    Oct. 31, 2013

(30) Foreign Application Priority Data

Apr. 30, 2012 (KR) .................. 10-2012-0045256

(51) Int. Cl.
*G06F 3/042* (2006.01)
*G06F 3/046* (2006.01)

(52) U.S. Cl.
USPC .......................................... 345/158; 345/175

(58) Field of Classification Search
CPC .................. G06F 3/041–3/047; G06F 3/0487; G06F 3/0488–3/04897
USPC ............. 178/18.01–18.11; 345/156, 173–179
See application file for complete search history.

(56) References Cited

U.S. PATENT DOCUMENTS

| 7,576,725 | B2 * | 8/2009 | Bathiche et al. | 345/156 |
| 7,612,559 | B2 | 11/2009 | Koivuaho | |
| 2006/0154652 | A1 | 7/2006 | Lee et al. | |
| 2007/0300182 | A1 * | 12/2007 | Bilow | 715/799 |
| 2008/0042993 | A1 * | 2/2008 | Jaeger et al. | 345/173 |
| 2008/0055271 | A1 * | 3/2008 | Yamaguchi et al. | 345/173 |
| 2009/0015553 | A1 * | 1/2009 | Hirahara et al. | 345/158 |
| 2010/0177060 | A1 * | 7/2010 | Han | 345/174 |

* cited by examiner

*Primary Examiner* — Nathan Danielsen
(74) *Attorney, Agent, or Firm* — Birch, Stewart, Kolasch & Birch, LLP

(57) ABSTRACT

An interactive display device which senses an external device and operates according to the sensed result and a control method thereof are disclosed. A method for controlling an interactive display device includes detecting an external device on a surface of the interactive display device, wherein the external device includes a plurality of identification markers sensed by the interactive display device, scanning a shape of the external device, sensing signals of the identification markers, determining coordinate information and contact information of the external device on the surface of the interactive display device based on a result of scanning the shape and sensing the signals, wherein the contact information indicates which side of the external device is in contact with the interactive display device, and displaying data around the external device according to the determined coordinate information and contact information.

20 Claims, 12 Drawing Sheets

(a)

(b)

(a)  (b)

(c)

(a)

(b)

(a)          (b)

(c)

(a)

(b)

(c)

(a)

(b)

(c)

(a)

(b)

(a)

(b)

(a)

(b)

(a)

(b)

INTERACTIVE DISPLAY DEVICE AND CONTROL METHOD THEREOF

This application claims the benefit of Korean Patent Application No. 10-2012-0045256, filed on Apr. 30, 2012, which is hereby incorporated by reference as if fully set forth herein.

BACKGROUND OF THE INVENTION

1. Field of the Invention

The present invention relates to an interactive display device, and more particularly, to an interactive display device which senses an external device and operates according to the sensed result, and a control method thereof.

2. Discussion of the Related Art

As various types of portable devices have been provided, users frequently store or share data using the portable device in daily life. However, since the portable device has a limited storage space, an additional storage space which can back up data stored by a user is required. Further, due to a limited display area, it is difficult for the portable device to share data with other users through a display included therein.

Accordingly, an interactive display device which is capable of recognizing an external device such as the portable device and displaying related data is required. The interactive display device needs a control method for accurately recognizing the shape, location, direction, etc. of an external device in order to recognize the external device located on the surface thereof and to display related data.

SUMMARY OF THE INVENTION

Accordingly, the present invention is directed to an interactive display device and a control method thereof that substantially obviate one or more problems due to limitations and disadvantages of the related art.

An object of the present invention is to provide an interactive display device which can accurately recognize an external device and can display related data, and a control method thereof. Especially, the interactive display device of the present invention needs to offer a convenient user interface by adaptively displaying data according to the shape, location, and direction of the external device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling an interactive display device includes detecting an external device on a surface of the interactive display device, wherein the external device includes a plurality of identification markers sensed by the interactive display device, scanning a shape of the external device, sensing signals of the identification markers, determining coordinate information and contact information of the external device on the surface of the interactive display device based on a result of scanning the shape and sensing the signals, wherein the contact information indicates which side of the external device is in contact with the interactive display device, and displaying data around the external device according to the determined coordinate information and contact information.

The method for controlling an interactive display device may further include recognizing signal patterns of the identification markers of the external device, wherein the signal patterns are generated by state variations of the signals of the identification markers, and receiving data for the external device by the recognized signal patterns.

In the method for controlling an interactive display device, the data for the external device may include at least one of a serial number, a model number, a MAC address, a manufacturer, user information, and service provider information of the external device.

In the method for controlling an interactive display device, recognizing signal patterns of the identification markers may further include detecting the signal patterns of the identification markers generated by the identification markers, wherein the signal patterns are generated by three identification markers generating the same signal pattern or by two identification markers generating different signal patterns.

The method for controlling an interactive display device may further include, if a plurality of external devices is present on the surface of the interactive display device, recognizing signal patterns generated by identification markers of each of the plurality of external devices, and identifying each of the plurality of external devices by the recognized identification patterns.

In the method for controlling an interactive display device, the coordinate information may include at least one of a location of the external device on the surface of the interactive display device, an angle between the external device and the interactive display device, and a direction in which a front side of the external device faces.

In the method for controlling an interactive display device, the identification markers may include at least one of a magnetic field source, an infrared source, a luminous source, and an ultrasonic wave source.

In the method for controlling an interactive display device, the displayed data is data extracted from the external device or the interactive display device.

In the method for controlling an interactive display device, displaying data may further include detecting variation of the coordinate information or contact information, and shifting the displayed data in a front direction of the external device in proportion to a varied angle between the external device and the interactive display device.

In the method for controlling an interactive display device may further include, if a data displayed part is hidden by an object on the surface of the interactive display device, detecting a hidden part of the displayed data, and displaying the displayed data in a region included in a user view range.

In another aspect of the present invention, an interactive display device includes a pixel sensor unit for scanning a shape of an external device, an identification marker sensor unit of a signal of an identification marker, a display unit for displaying data, and a controller for controlling the units, wherein the controller performs operations including detecting the external device on the display unit wherein the external device includes a plurality of identification markers sensed by the identification marker sensor unit, scanning a shape of the external device, sensing signals of the identification markers, determining coordinate information and contact information of the external device on the display unit based on a result of scanning the shape and sensing the signals wherein the contact information indicates which side of the external device is in contact with the interactive display device, and displaying data around the external device according to the determined coordinate information and contact information.

The controller of the interactive display device may further perform operations including recognizing signal patterns of the identification markers of the external device wherein the signal patterns are generated by state variations of the signals of the identification markers, and receiving data for the external device by the recognized signal patterns.

In the interactive display device, the data for the external device may include at least one of a serial number, a model number, a MAC address, a manufacturer, user information, and service provider information of the external device.

In the interactive display device, the operation of recognizing signal patterns of the identification markers performed by the controller may further include detecting the signal patterns of the identification markers generated by the identification markers, wherein the signal patterns are generated by three identification markers generating the same signal pattern or by two identification markers generating different signal patterns.

In the interactive display device, if a plurality of external devices is present on the display unit, the controller may further perform operations including recognizing signal patterns generated by identification markers of each of the plurality of external devices, and identifying each of the plurality of external devices by the recognized identification patterns.

In the interactive display device, the coordinate information may include at least one of a location of the external device on the display unit, an angle between the external device and the display unit, and a direction in which a front side of the external device faces.

In the interactive display device, the identification markers may include at least one of a magnetic field source, an infrared source, a luminous source, and an ultrasonic wave source.

In the interactive display device, the displayed data may be data extracted from the external device or the interactive display device.

In the interactive display device, the operation of displaying data performed by the controller may further perform operations including detecting variation of the coordinate information or contact information, and shifting the displayed data in a front direction of the external device in proportion to a varied angle between the external device and the display unit.

In the interactive display device, if a data displayed part is hidden by an object on the display unit, the controller may further perform operations including detecting a hidden part of the displayed data, and displaying the displayed data in a region included in a user view range.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Although the terms used in this specification are selected from generally known and used terms while considering functions of the present invention, they may vary according to intention or customs of those skilled in the art or to emergence of new technology. Some terms may have been selected by the applicant at his or her discretion and, in such cases, the detailed meanings thereof will be described in relevant parts of the description herein. Thus, the terms used in this specification should be interpreted based on the substantial meanings of the terms and the whole contents of this specification rather than their simple names or meanings.

Figure 1:
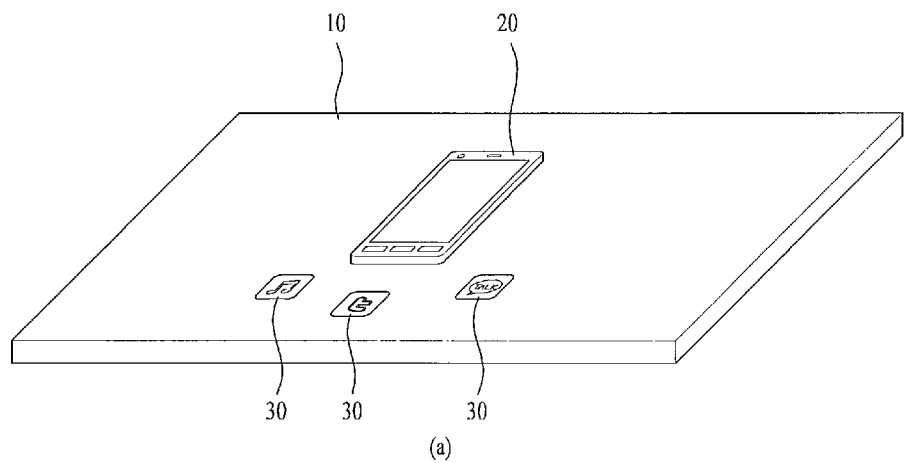
FIGS. 1A and 1B are diagrams illustrating operation states of an interactive display device according to an exemplary embodiment of the present invention.
Figure 1:
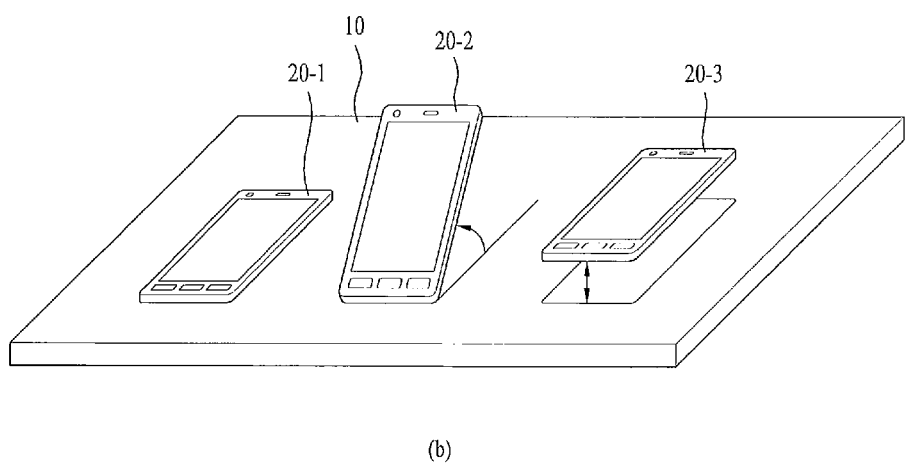

FIGS. 1A and 1B are diagrams illustrating operation states of an interactive display device according to an exemplary embodiment of the present invention.

In the present invention, an interactive display device 10 recognizes an external device 20 placed on the surface thereof to display data 30 for the external device 20, as illustrated in FIG. 1A. Here, data for the external device 20 may include data transmitted to the interactive display device 10 from the external device 20, data which is transmitted by the external device 20 to a server device through a network and then is received by the interactive display device 10 from the server device through the network, and data related to the external device 20 among data stored in the interactive display device 10.

The interactive display device 10 may recognize the external device 20 using a method for recognizing the shape of the external device 20 through a pixel sensor or a method for recognizing a signal of an identification marker of the external device 20 through an identification marker sensor.

The identification marker may refer to a constituent element which is included in the external device 20 and which can generate an identifiable signal pattern. In the present invention, the identification marker may include at least one of a magnetic field source generating a magnetic field, an infrared source generating an infrared signal, a luminous source generating a visible light signal, an electromagnetic source generating an electromagnetic wave, and an ultrasonic wave source generating an ultrasonic wave signal.

The identification marker sensor may be a sensor which is included in the interactive display device 10 and which is capable of sensing a signal of the above-mentioned identification marker. The identification marker sensor may include at least one of a magnetic field sensor, an infrared sensor, a visual light sensor, an electromagnetic wave sensor, and an ultrasonic sensor in correspondence to the identification marker.

The interactive display device 10 may display data as text, images, etc. The interactive display device 10 may display data in consideration of the location of the external device 20 on the surface thereof. In addition to the location of the external device 20, the direction in which the external device 20 faces and the distance and angle between the external device 20 and the surface of the interactive display device 10 may be additionally considered to display data.

FIG. 1B illustrates external devices which are placed with different distances from the surface of the interactive display device 10 in different manners. An external device 20-1 may be adjacent to the surface of the interactive display device 10 in parallel with the interactive display device 10. In this case, the distance and angle between the external device 20 and the surface of the interactive display device 10 approximates to zero and may be expressed as plane coordinate information of the surface of the interactive display device.

An external device 20-2 may obliquely lean at a prescribed angle on the surface of the interactive display device 10 in partial contact with the interactive display device 10. For example, the external device 20-2 is supported by hand or a cradle. At this time, a prescribed angle may be formed between the external device 20-2 and the surface of the interactive display device 10. The distance between the external device 20-2 and the surface of the interactive display device 10 may have a value between 0 and the long-axis length of the external device 20-2.

An external device 20-3 may be placed on the surface of the interactive display device 10 not in contact with the interactive display device 10. For example, this case is when a specific object is present between the external device 20-3 and the surface of the interactive display device 10 or when the external device 20-3 is gripped by a user. At this time, the external device 20-3 may maintain a prescribed distance from the surface of the interactive display device 10. The angle between the external device 20-3 and the surface of the interactive display device 10 approximates to 0 and the distance therebetween may increase within the range in which the interactive display device 10 can recognize the external device 20-3.

The location relationship between the external device 20 and the interactive display device 10 may be expressed as combinations of the above-described three cases. The interactive display device 10 of the present invention can display data by accurately recognizing such location relationship.

Figure 2:
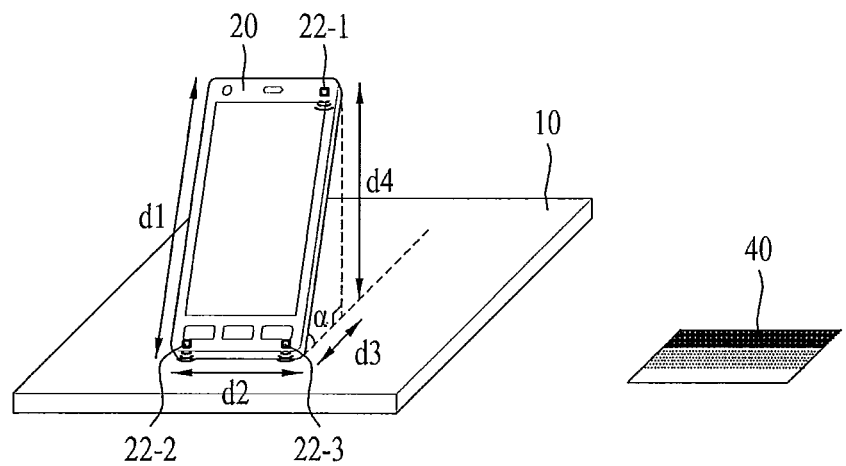
FIGS. 2A to 2C are diagrams illustrating an external device recognition method of an interactive display device according to an exemplary embodiment of the present invention.
Figure 2:
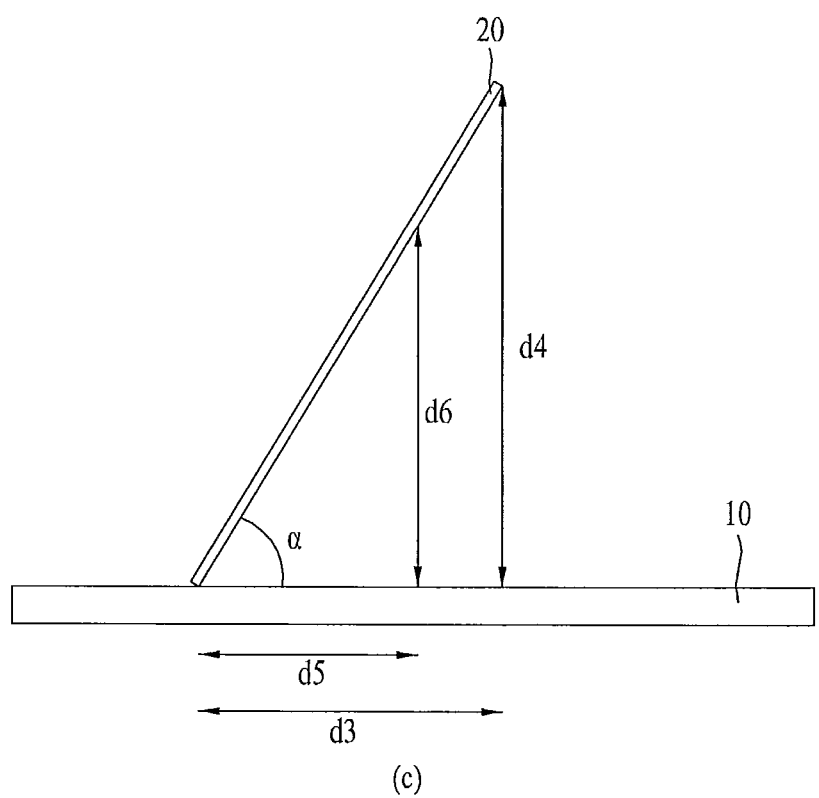
Figure 3:
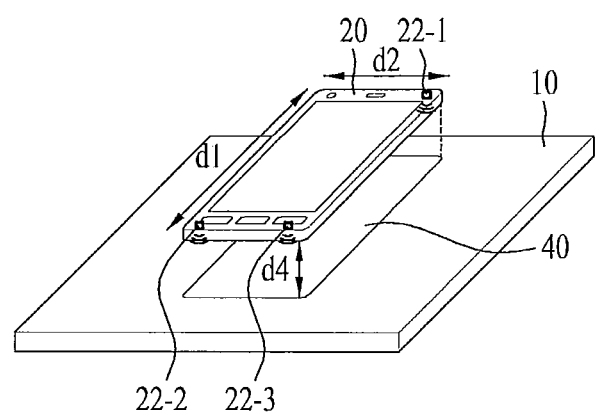
FIGS. 3A and 3B are diagrams illustrating an external device recognition method of an interactive display device according to an exemplary embodiment of the present invention, wherein the external device is at a long distance from the interactive display device.
Figure 3:
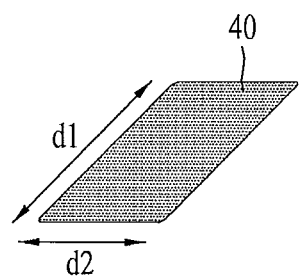
Figure 4:
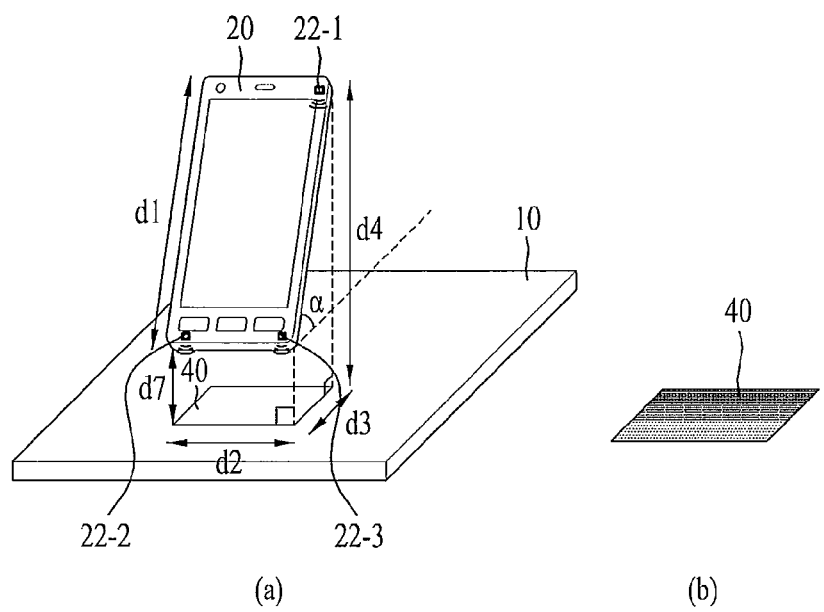
FIGS. 4A to 4C are diagrams illustrating an external device recognition method of an interactive display device according to another exemplary embodiment of the present invention, wherein the external device is at a long distance from the interactive display device.
Figure 4:
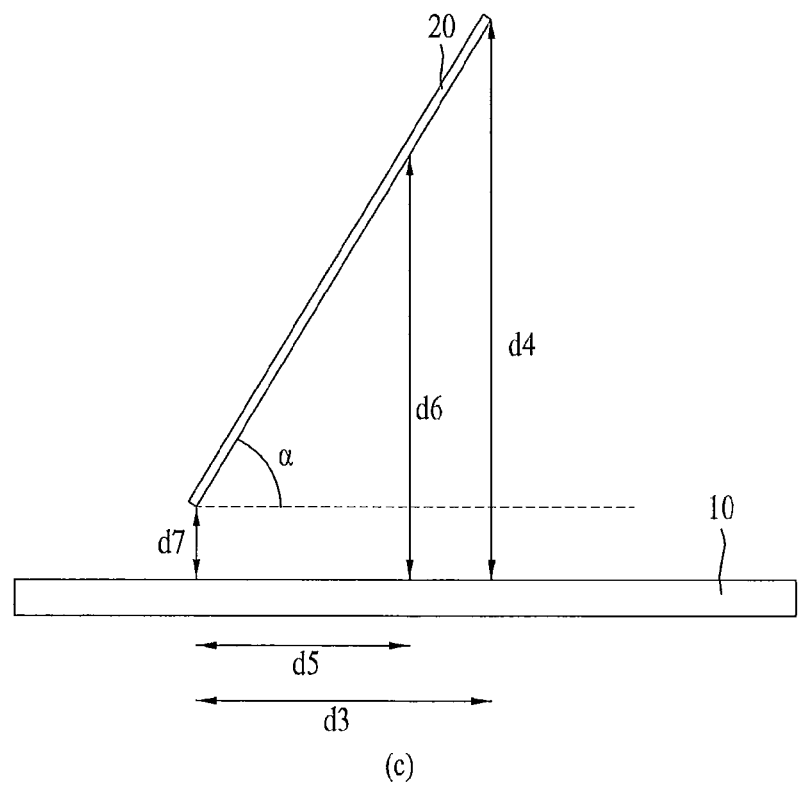

FIGS. 2A to 2C are diagrams illustrating an external device recognition method of an interactive display device according to an exemplary embodiment of the present invention.

In FIG. 2A, if the external device 20 is placed on the surface of the interactive display device 10, the interactive display device 10 may recognize the external device 20 using pixel sensors and identification marker sensors. In FIG. 2A, the external device 20 has a long-axis length d1, a short-axis length d2, and a tilt angle α. In this case, the pixel sensors of the interactive display device 10 recognize the length d2 with respect to the short-axis of the external device 20. However, with respect to the long-axis of the external device 20, the pixel sensors recognize a length d3 which varies according to the tilt angle α. A method for recognizing the long-axis length d1 will be described later.

The pixel sensors of the interactive display device 10 may sense the distance to a sensed object. As shown in FIG. 2B, the pixel sensors differently express the brightness of a sensed image 40 according to the distance to a sensed object. In other words, a part of the external device 20 which is in contact with the surface of the interactive display device 10 is expressed in white, and a part of the external device 20 distanced from the surface of the interactive display device 10 by a prescribed interval or more may be expressed in black after a process of expressing gradation regions according to distance. Accordingly, the interactive display device 10 may calculate a vertical distance d4 between the interactive display device 10 and a specific part of the external device 20 by a brightness ratio of the image 40 sensed by the pixel sensors. Here, the specific part may be a part of the external device 20 having the longest vertical distance from the surface of the interactive display device 10 as shown in FIG. 2A.

The interactive display device 10 may determine the location, direction, and tilt angle of the external device 20 using a sensed result of the pixel sensors. The interactive display device 10 may determine the location of the external device 20 on the surface of the interactive display device 10 by the location of the sensed image 40 and determine the direction of the external device 20 by a gradation direction of the sensed image 40. Namely, the interactive display device 10 may determine that the external device 20 faces the direction in which the gradation of the sensed image 40 is changed to white from black.

The tilt angle α may be determined by calculating arctan (d4/d3) from the sensed d3 and d4. If the tilt angle α is determined, the interactive display device 10 may determine the long-axis length d1 based on at least two values among α, d3, and d4. For example, d1 may be determined by applying the Pythagorean theorem to d3 and d4 or by applying the trigonometric function to α and d3 or to α and d4.

Through this process, the interactive display device 10 can recognize an actual shape of the external device 20.

Since the above-described pixel sensors express an object which is separated from the surface of the interactive display device 10 by a prescribed interval or more in black irrespective of the distance to the object, it may be difficult to accurately measure the distance d4. Here, the distance that it is difficult to accurately measure is referred to as a limit distance. If the distance between the surface of the interactive display device 10 and the specific part of the external device 20 exceeds the limit distance, it may be difficult to accurately measure the tilt angle α of the external device 20 using the above methods. This is because it is difficult to accurately measure the distance d4 since the pixel sensors of the interactive display device 10 express an object or a part of an object separated by the limit distance or more in black regardless of the distance. If it is difficult to accurately measure the distance d4 from the image 40 sensed by the pixel sensors, the interactive display device 10 may use a gradation part of the sensed image.

FIG. 2C is a plan view taken from the right side of FIG. 2A and illustrates a method for measuring the tilt angle α using the gradation region of the image sensed by the pixel sensors. The interactive display device 10 may calculate a vertical distance d6 from the surface of the interactive display device 10 to the external device 20 in the gradation region of the sensed image 40. Through this, the interactive display device 10 may determine the title angle α of the external device 20 by calculating arctan(d6/d5) using the above calculated vertical distance d6 and a distance d5 between a contact part of the external device 20 on the surface of the interactive display device 10 and a corresponding gradation region.

As described above, the interactive display device 10 may determine the location, direction, and tilt angle of the external device 20 and adaptively display data according to the state of the external device 20 based on the determined values.

The interactive display device 10 may calculate the distance to the external device 20 using a signal of an identification marker. In FIGS. 2A to 4C, an exemplary embodiment using magnetic field sources among identification markers will be described. However, the identification markers of the present invention are not limited to the magnetic field sources, the above mentioned infrared sources, luminous sources, and ultrasonic wave sources may be used instead of the magnetic field sources mentioned with reference to FIGS. 2A to 4C.

A magnetic field differs in strength according to distance. Accordingly, if the strength of the magnetic field is measured, the distance between a magnetic field source generating the magnetic field and the interactive display device 10 may be estimated. As shown in FIG. 2A, the external device 20 may include magnetic field sources 22-1, 22-2, and 22-3 on a plurality of edges thereof. The interactive display device 10 senses magnetic fields generated from the magnetic field sources 22-1, 22-2, and 22-3 and measures the strengths of the magnetic fields. The magnetic field sources 22-1, 22-2, and 22-3 generate magnetic fields of the same strength and the interactive display device 10 may compare relative strengths of the sensed magnetic fields to calculate a distance up to each magnetic field source.

For example, the interactive display device 10 may sense a magnetic field of the relatively strongest strength from the magnetic field sources 22-2 and 22-3 which are in contact with the surface of the interactive display device 10 among the magnetic field sources included in the external device 20. In addition, the interactive display device 10 may sense a magnetic field of a relatively weak strength from the magnetic field source 22-1 distant therefrom. In this way, the interactive display device 10 may measure the distance d4 using a difference between relative strengths of the magnetic fields.

Accordingly, the interactive display device 10 may determine the location, direction, and tilt angle of the external device 20 even when using magnetic field sensors as well as when using the aforementioned pixel sensors. Consequently, the interactive display device 10 may adaptively display data according to the state of the external device 20 based on the determined values.

FIGS. 3A and 3B are diagrams illustrating an external device recognition method of an interactive display device according to an exemplary embodiment of the present invention, wherein the external device is at a long distance from the interactive display device.

In FIG. 3A, the external device 20 may be located in parallel with the surface of the interactive display device 10 and, as a result, all parts of the external device may be separated from the surface of the interactive display device 10 by the same distance. In FIG. 3A, the interactive display device 10 may recognize the shape of the external device 20 using the pixel sensors as described with reference to FIGS. 2A to 2C.

An image 40 sensed by the pixel sensors is shown in FIG. 3B. The image 40 sensed by the interactive display device 10 may be expressed in a single color without any gradation because the distance from the surface of the interactive display device 10 to each part of the external device 20 is the same. The interactive display device 10 may measure a long-axis length d1 and a short-axis length d2 of the external device 20 through the image 40 sensed by the pixel sensors. The interactive display device 10 may measure a distance d4 up to the external device 20 using the brightness ratio of the sensed image 40. Alternatively, the interactive display device 10 may use magnetic field sensors to calculate the distance d4 by measuring the strengths of magnetic fields generated from the magnetic field sources 22-1, 22-2, and 22-3 of the external device 20. If the distance d4 exceeds the limit distance of the pixel sensors included in the interactive display device 10, the interactive display device 10 may perform distance measurement using the magnetic field sensors. Even when the pixel sensors cannot measure the distance through the sensed image due to the presence of an object between the surface of the interactive display device 10 and the external device 20, the interactive display device 10 may measure the distance d4 through the magnetic fields measured using the magnetic field sensors.

FIGS. 4A to 4C are diagrams illustrating an external device recognition method of an interactive display device according to another exemplary embodiment of the present invention, wherein an external device is at a long distance from the interactive display device.

In FIG. 4A, if the external device 20 is separated from the surface of the interactive display device 10 by a prescribed interval, the interactive display device 10 may recognize the external device 20 using the pixel sensors and magnetic field sensors. In FIG. 4A, the external device 20 has a long-axis length d1, a short-axis length d2, and a tilt angle α. Then the pixel sensors of the interactive display device 10 recognize the length d2 with respect to the short-axis of the external device 20. However, with respect to the long-axis of the external device 20, the pixel sensors recognize a length d3 which varies according to the tilt angle α.

The pixel sensors of the interactive display device 10 may sense a distance to a sensed object as described with reference to FIGS. 2A to 2C. As shown in FIG. 4B, the pixel sensors may differently express the brightness of a sensed image 40 according to the distance to a sensed object. In FIG. 4A, since the external device 20 is separated from the surface of the interactive display device 10 by a prescribed interval, the image 40 sensed by the pixel sensors does not include a white region and includes a gradation region starting from gray tone and a black region. This is because the white region is expressed when an object is in contact with the surface of the interactive display device 10. Accordingly, the interactive display device 10 may recognize that the external device 20 is separated from the surface of the interactive display device 10 by a prescribed interval or more by identifying that the image 40 sensed by the pixel sensors does not include a white region.

The interactive display device 10 may calculate vertical distances d4 and d7 from the interactive display device 10 to specific parts of the external device 20 using the brightness ratio of the image 40 sensed by the pixel sensors. The specific parts may be parts of the external device 20 having the longest and shortest vertical distances with the surface of the interactive display device 10 as shown in FIG. 4A.

The interactive display device 10 may determine the location, direction, and tilt angle of the external device 20 using the sensed result of the pixel sensors. The interactive display device 10 may determine the location of the external device 20 on the surface thereof by the location of the sensed image 40 and determine the direction of the external device 20 by the gradation direction of the sensed image 40. The interactive display device 10 may determine the tilt angle $\alpha$ by calculating arctan $\{(d4-d7)/d3\}$ from the sensed d3, d4, and d7. If the tilt angle $\alpha$ is determined, the interactive display device 10 may determine the distance d1 using $\alpha$ and d3. Through this process, the interactive display device 10 may recognize an actual shape of the external device 20.

Since the pixel sensors express an object separated by a prescribed interval or more in black irrespective of the distance to the object, it may be difficult to accurately measure the distance d4. If the distance between the surface of the interactive display device 10 and a specific part of the external device 20 exceeds the limit distance of the pixel sensors, it may be difficult to accurately measure the tilt angle $\alpha$ of the external device 20 using the above methods. This is because it is difficult for the pixel sensors of the interactive display device 10 to accurately measure the distance d4. Accordingly, if it is difficult to accurately measure the distance d4 from the image 40 sensed by the pixel sensors, the interactive display device 10 may use a gradation part of the sensed image.

FIG. 4C is a plan view taken from the right side of FIG. 4A and illustrates a method for measuring the tilt angle $\alpha$ using the gradation region of the image sensed by the pixel sensors. The interactive display device 10 may calculate a vertical distance d6 between the surface of the interactive display device 10 and the external device 20 in the gradation region of the sensed image 40. Through this, the interactive display device 10 may determine the tilt angle $\alpha$ of the external device 20 by calculating arctan $\{(d6-d7/d5)\}$ using the above calculated vertical distance d6 and a distance d5 between a part having the shortest vertical distance from the external device 20 and a corresponding gradation region.

As described above, the interactive display device 10 may determine the location, direction, and tilt angle of the external device 20 and adaptively display data according to the state of the external device 20 based on the determined values.

The interactive display device 10 may calculate the distance to the external device 20 using magnetic field sensors. Since a magnetic field differs in strength according to distance, if the strength of the magnetic field is measured, a distance to a magnetic field source generating the magnetic field may be estimated. As shown in FIG. 4A, the external device 20 may include magnetic field sources 22-1, 22-2, and 22-3 on a plurality of edges thereof. The interactive display device 10 senses magnetic fields generated from the magnetic field sources 22-1, 22-2, and 22-3 and measures the strengths of the magnetic fields. Since each of the magnetic field sources 22-1, 22-2, and 22-3 generates a magnetic field of the same strength, the interactive display device 10 may calculate a distance up to each magnetic field from the surface thereof by comparing relative strengths of the sensed magnetic fields.

For example, the interactive display device 10 may measure the strengths of the magnetic fields generated from the magnetic field sources 22-2 and 22-3 which are separated from the surface of the interactive display device 10 by a given distance d7 among the magnetic field sources included in the external device 20. The interactive display device 10 may measure the separated distance by comparing the measured strengths with the strength of a magnetic field when the external device 20 is in contact with the surface of the interactive display device 10. Alternatively, the interactive display device 10 may measure the separated distance using the strength of a standardized magnetic field generated by a magnetic field source of the external device even without information about the strength of the magnetic field when the external device 20 is in contact with the interactive display device 10. When the external device includes a standardized magnetic field source, the interactive display device 10 previously stores information about the strength. If the magnetic field is detected, the interactive display device 10 may compare the strength with the previously stored value to measure the separated distance.

The interactive display device 10 may sense a magnetic field of a relatively weak strength from the magnetic field source 22-1 located a long distance therefrom. The interactive display device 10 may measure the distance d4 by comparing the strength of the sensed magnetic field with each of the strengths of the magnetic fields sensed from the magnetic field sources 22-2 and 22-3. In this case, the strength of a magnetic field when the external device 20 is in contact with the interactive display device 10 or the information about the strength of the aforementioned standardized magnetic field may be additionally considered as the compared target.

The interactive display device 10 may measure the distances d4 and d7 using a difference between relative strengths of such magnetic fields.

Accordingly, the interactive display device 10 may determine the location, direction, and tilt angle of the external device 20 even when using the magnetic field sensors as well as when using the aforementioned pixel sensors. Consequently, the interactive display device 10 may adaptively display data according to the state of the external device 20 based on the determined values.

Figure 5:
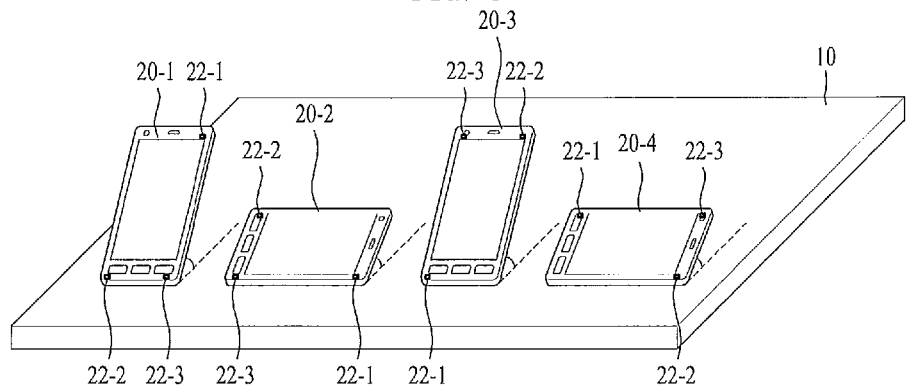
FIGS. 5A to 5C are diagrams illustrating a rotation angle detection method of an external device including three identification markers according to an exemplary embodiment of the present invention.
Figure 5:
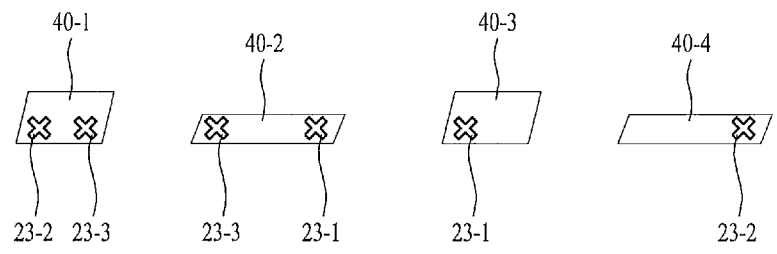
Figure 5:
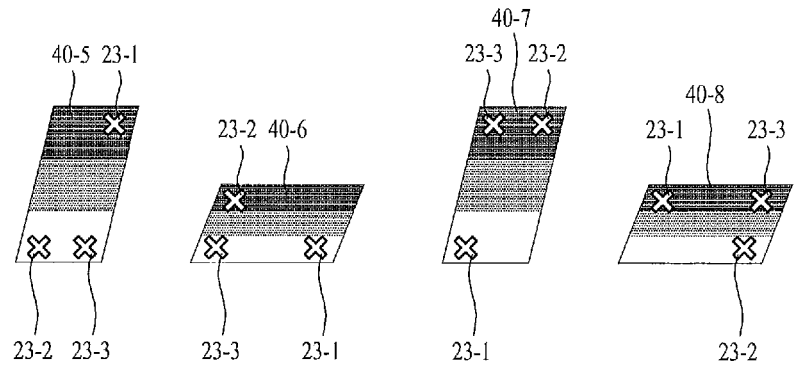

FIGS. 5A to 5C are diagrams illustrating a rotation angle detection method of an external device including three identification markers according to an exemplary embodiment of the present invention.

A rotation angle of the external device 20 may indicate which side of the external device 20 is in contact with the surface of the interactive display device 10 and this information may be referred to as contact information. An identification marker which will be described hereinbelow may mean at least one of a magnetic field source, an infrared source, a luminous source, and an ultrasonic wave source.

FIG. 5A illustrates external devices 20-1, 20-2, 20-3, and 20-4 having rotation angles of 0, 90, 180, and 270 degrees clockwise, respectively, on the surface of the interactive display device 10. FIG. 5B illustrates results of sensing a contact part of the external devices 20-1, 20-2, 20-3, and 20-4 by pixel sensors and identification marker sensors of the interactive display device 10. FIG. 5C illustrates results of sensing a contact part and a non-contact part of the external devices 20-1, 20-2, 20-3, and 20-4 by pixel sensors and identification marker sensors of the interactive display device 10.

In FIG. 5A, each external device may include three identification markers 22-1, 22-2, and 22-3 for generating the same signal pattern. The signal pattern of the identification marker refers to a sensible signal pattern which may be formed by varying the direction or strength of a signal generated by the identification marker at every given period or by switching the identification marker on and off. This signal pattern will be described in detail in association with FIGS. 7A and 7B.

If the external device 20-1 has a rotation angle of 0 degrees, two identification markers 22-2 and 22-3 may be adjacent to the surface of the interactive display device 10. In this case, two sensed signals 23-2 and 23-3 of the identification markers may be provided together with a white region indicating a contact region as a result 40-1 that the pixel sensors and identification marker sensors of the interactive display device 10 sense the contact part of the external device 20-1. The white region of the sensed image corresponds to a short-axis length of the external device 20-1.

A result 40-5 of sensing the contact part and non-contact part of the external device 20-1 may further include a sensed image of the pixel sensors for the non-contact part and one sensed signal 23-1 of the identification marker in a black region of a right upper part in addition to the above sensed result 40-1. Thus, the interactive display device 10 may determine contact information indicating that a side including two identification markers of sides corresponding to the short-axis of the external device 20-1 is in contact with the surface of the interactive display device 10.

If the external device 20-1 has a rotation angle of 90 degrees, two identification markers 22-1 and 22-3 may be adjacent to the surface of the interactive display device 10. In this case, two sensed signals 23-1 and 23-3 of the identification markers may be provided together with a white region indicating a contact region as a result 40-2 that the pixel sensors and identification marker sensors of the interactive display device 10 sense the contact part of the external device 20-2. The white region of the sensed image corresponds to a long-axis length of the external device 20-2.

A result 40-6 of sensing the contact part and non-contact part of the external device 20-2 may further include a sensed image of the pixel sensors for the non-contact part and one sensed signal 23-2 of the identification marker in a black region of a left upper part in addition to the above sensed result 40-2. Thus, the interactive display device 10 may determine contact information indicating that a side including two identification markers of sides corresponding to the long-axis of the external device 20-2 is in contact with the surface of the interactive display device 10.

If the external device 20-1 has a rotation angle of 180 degrees, one identification marker 22-1 may be adjacent to the surface of the interactive display device 10. In this case, one sensed signal 23-1 of the identification marker may be provided together with a white region indicating a contact region as a result 40-3 that the pixel sensors and identification marker sensors of the interactive display device 10 sense the contact part of the external device 20-3. The white region of the sensed image corresponds to a short-axis length of the external device 20-1.

A result 40-7 of sensing the contact part and non-contact part of the external device 20-3 may further include a sensed image of the pixel sensors for the non-contact part and two sensed signals 23-2 and 22-4 of the identification markers in a black region of an upper part in addition to the above sensed result 40-3. Thus, the interactive display device 10 may determine contact information indicating that a side including one identification marker of sides corresponding to the short-axis length of the external device 20-3 is in contact with the surface of the interactive display device 10.

If the external device 20-1 has a rotation angle of 270 degrees, one identification marker 22-2 may be adjacent to the surface of the interactive display device 10. In this case, one sensed signal 23-2 of the identification marker may be provided together with a white region indicating a contact region as a result 40-4 that the pixel sensors and identification marker sensors of the interactive display device 10 sense the contact part of the external device 20-4. The white region of the sensed image corresponds to a long-axis length of the external device 20-4.

A result 40-8 of sensing the contact part and non-contact part of the external device 20-4 may further include a sensed image of the pixel sensors for the non-contact part and two sensed signals 23-1 and 23-3 of the identification markers in a black region of an upper part in addition to the above sensed result 40-4. Thus, the interactive display device 10 may determine contact information indicating that a side including one identification marker of sides corresponding to the long-axis length of the external device 20-4 is in contact with the surface of the interactive display device 10.

As described above, since the interactive display device 10 has different sensed results according to the rotation angles of the external device 20, the interactive display device 10 may measure the rotation angle of the external device 20 or determine contact information of the external device 20. The sensed result may include the length of an image sensed by the pixel sensors and the location of the sensed signal of the identification marker on the sensed image. Accordingly, the interactive display device 10 may adaptively display data for the external device 20 according to the measured rotation angle or the determined contact information.

Figure 6:
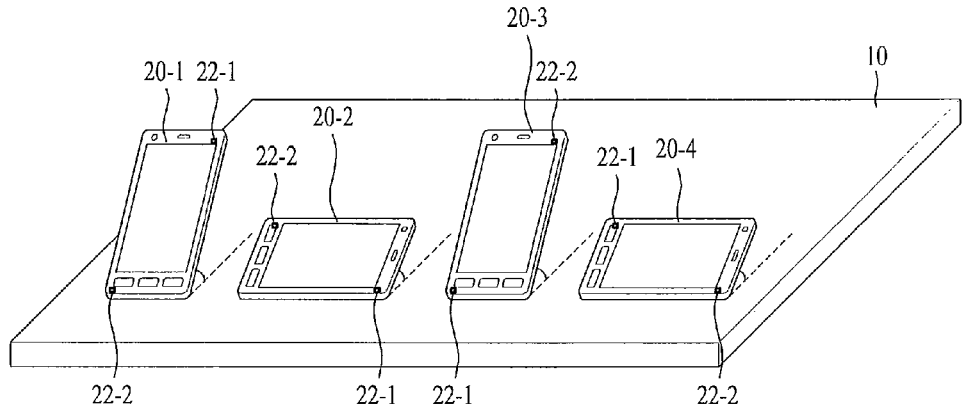
FIGS. 6A to 6C are diagrams illustrating a rotation angle detection method of an external device including two identification markers according to an exemplary embodiment of the present invention.
Figure 6:
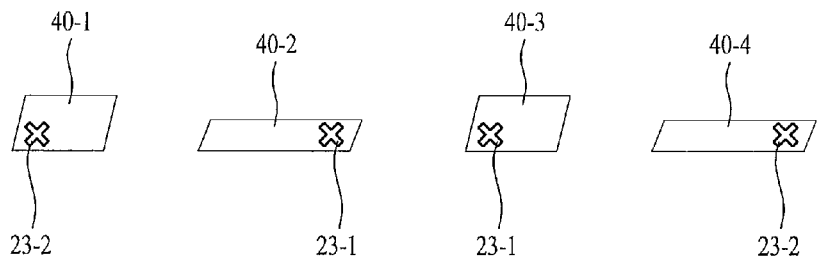
Figure 6:
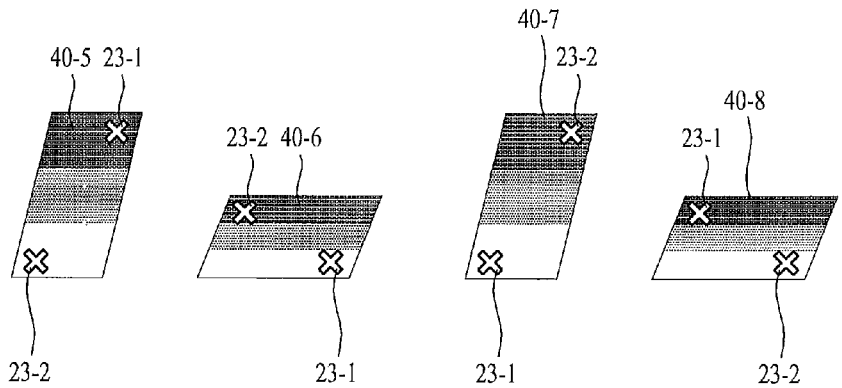

FIGS. 6A to 6C are diagrams illustrating a rotation angle detection method of an external device including two identification markers according to an exemplary embodiment of the present invention.

FIG. 6A illustrates external devices 20-1, 20-2, 20-3, and 20-4 having rotation angles of 0, 90, 180, and 270 degrees clockwise, respectively, on the surface of the interactive display device 10. FIG. 6B illustrates results of sensing a contact part of the external devices 20-1, 20-2, 20-3, and 20-4 by pixel sensors and identification marker sensors of the interactive display device 10. FIG. 6C illustrates results of sensing a contact part and a non-contact part of the external devices 20-1, 20-2, 20-3, and 20-4 by pixel sensors and identification marker sensors of the interactive display device 10.

In FIG. 6A, each external device may include two identification markers 22-1 and 22-2 for generating different signal patterns. The signal pattern refers to a sensible signal pattern which may be formed by varying the direction or strength of a signal generated by an identification marker at every given period or by switching on and off the identification marker. This signal pattern will be described in detail in association with FIGS. 7A and 7B.

In the following description, a signal pattern caused by a first identification marker 22-1 of the two identification markers is defined as a first signal pattern and a signal pattern caused by a second identification marker 22-2 is defined as a second signal pattern.

If the external device 20-1 has a rotation angle of 0 degrees, one identification marker 22-2 may be adjacent to the surface of the interactive display device 10. In this case, one sensed identification marker 23-2 may be provided together with a white region indicating a contact region as a result 40-1 that the pixel sensors and identification marker sensors of the interactive display device 10 sense the contact part of the external device 20-1. The white region of the sensed image corresponds to a short-axis length of the external device 20-1.

A result 40-5 of sensing the contact part and non-contact part of the external device 20-1 may further include a sensed image of the pixel sensors for the non-contact part and one sensed signal 23-1 of the identification marker in a black region of a right upper part in addition to the above sensed result 40-1. Thus, the interactive display device 10 may determine contact information indicating that a side including the second signal pattern of sides corresponding to the short-axis of the external device 20-1 is in contact with the surface of the interactive display device 10.

If the external device 20-2 has a rotation angle of 90 degrees, one identification marker 22-1 may be adjacent to the surface of the interactive display device 10. In this case, one sensed signal 23-1 of the identification marker may be provided together with a white region indicating a contact region as a result 40-2 that the pixel sensors and identification marker sensors of the interactive display device 10 sense the contact part of the external device 20-2. The white region of the sensed image has a long-axis length of the external device 20-2.

A result 40-6 of sensing the contact part and non-contact part of the external device 20-2 may further include a sensed image of the pixel sensors for the non-contact part and one sensed signal 23-2 of the identification marker in a black region of a left upper part in addition to the above sensed result 40-2. Thus, the interactive display device 10 may determine contact information indicating that a side including the first signal pattern of sides corresponding to the long-axis of the external device 20-1 is in contact with the surface of the interactive display device 10.

If the external device 20-2 has a rotation angle of 180 degrees, one identification marker 22-1 may be adjacent to the surface of the interactive display device 10. In this case, one sensed signal 23-1 of the identification marker may be provided together with a white region indicating a contact region as a result 40-3 that the pixel sensors and identification marker sensors of the interactive display device 10 sense the contact part of the external device 20-3. The white region of the sensed image corresponds to a short-axis length of the external device 20-3.

A result 40-7 of sensing the contact part and non-contact part of the external device 20-3 may further include a sensed image of the pixel sensors for the non-contact parts and one sensed signal 23-2 of the identification marker in a black region of a right upper part in addition to the above sensed result 40-3. Thus, the interactive display device 10 may determine contact information indicating that a side including the first signal pattern of sides corresponding to the short-axis of the external device 20-3 is in contact with the surface of the interactive display device 10.

If the external device 20-2 has a rotation angle of 270 degrees, one identification marker 22-2 may be adjacent to the surface of the interactive display device 10. In this case, one sensed signal 23-2 of the identification marker may be provided together with a white region indicating a contact region as a result 40-4 that the pixel sensors and identification marker sensors of the interactive display device 10 sense the contact part of the external device 20-4. The white region of the sensed image corresponds to a long-axis length of the external device 20-4.

A result 40-8 of sensing the contact part and non-contact part of the external device 20-4 may further include a sensed image of the pixel sensors for the non-contact part and one sensed signal 23-1 of the identification marker in a black region of a left upper part in addition to the above sensed result 40-4. Thus, the interactive display device 10 may determine contact information indicating that a side including the second signal pattern of sides corresponding to the long-axis of the external device 20-4 is in contact with the surface of the interactive display device 10.

As described above, since the interactive display device 10 has different sensed results according to the rotation angles of the external device 20 on the surface thereof, the interactive display device 10 may measure the rotation angle of the external device 20. The sensed result may include the length of an image sensed by the pixel sensors, the signal patterns of the sensed identification markers, and the locations of the signals of the sensed identification marker on the image. Accordingly, the interactive display device 10 may adaptively display data for the external device 20 according to the measured rotation angle.

Figure 7:
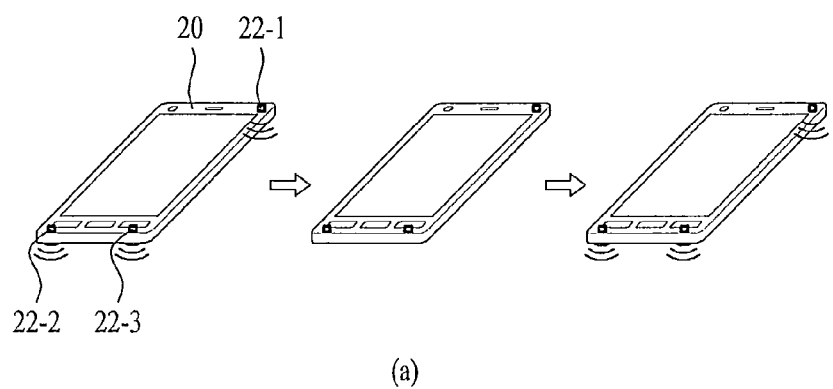
FIGS. 7A and 7B are diagrams illustrating a signal pattern formation method of an identification marker according to an exemplary embodiment of the present invention.
Figure 7:
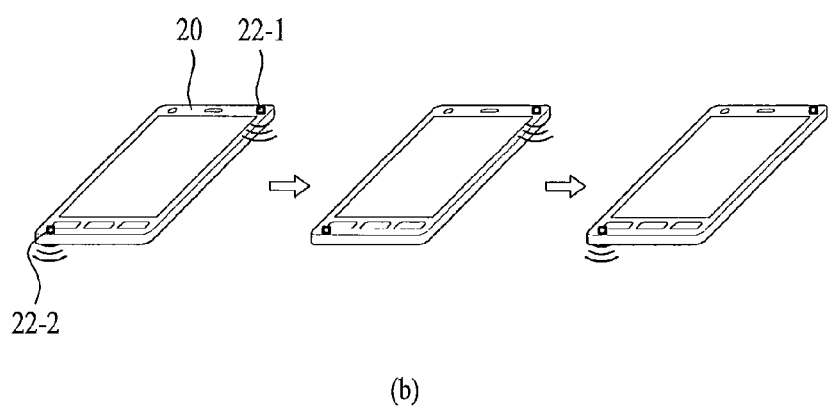

FIGS. 7A and 7B illustrate a signal pattern formation method of an identification marker according to an exemplary embodiment of the present invention.

In FIG. 7A, three identification markers 22-1, 22-2, and 22-3 included in the external device 20 form signal patterns. As described with reference to FIGS. 5A to 5C, if the external device 20 includes three identification markers, the interactive display device 10 may measure a rotation angle of the external device 20 using the identification markers. The three identification markers may generate the same signal pattern and may form the signal pattern by simultaneously generating and eliminating signals of the identification markers as shown in FIG. 7A. The signal pattern of the identification marker recognized by the interactive display device 10 may be formed by varying the generation period and length of the identification marker as in Morse code and varying the strength and direction of the identification marker.

In FIG. 7B, two identification markers 22-1 and 22-2 included in the external device 20 form signal patterns. As described with reference to FIGS. 6A to 6C, if the external device 20 includes two identification markers, the interactive display device 10 may measure a rotation angle of the external device 20 using the identification markers. The two identification markers 22-1 and 22-2 may generate different signal patterns and may form the signal patterns by generating and eliminating signals at different periods. The signal patterns of the identification markers recognized by the interactive display device 10 may differ according to the identification markers. The signal patterns may be formed by varying the occurrence period and length of signals generated by the identification markers and varying the strength and direction of signals generated by the identification markers.

The interactive display device 10 may receive data for the external device 20 by recognizing and sensing the signal patterns of the identification markers. As described previously, the identification marker may include at least one of a magnetic field source, an infrared source, a luminous source, and an ultrasonic wave source. Accordingly, the interactive display device 10 may receive and convert the state variations of magnetic field, infrared light, visible light, and ultrasonic waves, which are signals generated from the identification markers, into digital signals and may use or store the signals as data. The data for the external device 20 may include at least one of a serial number, a model number, a MAC address, a manufacturer, user information, and service provider information of the external device 20.

Figure 8:
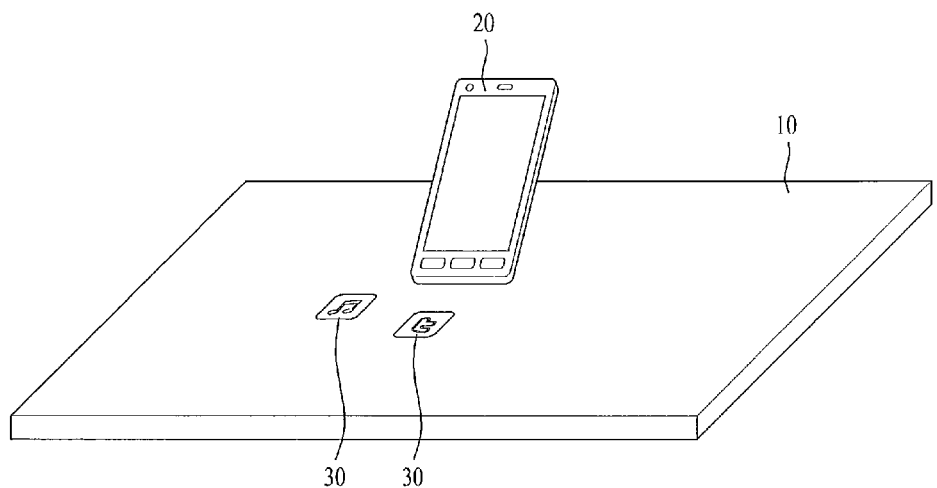
FIGS. 8A and 8B are diagrams illustrating a data display method according to movement of an external device in accordance with an exemplary embodiment of the present invention.
Figure 8:
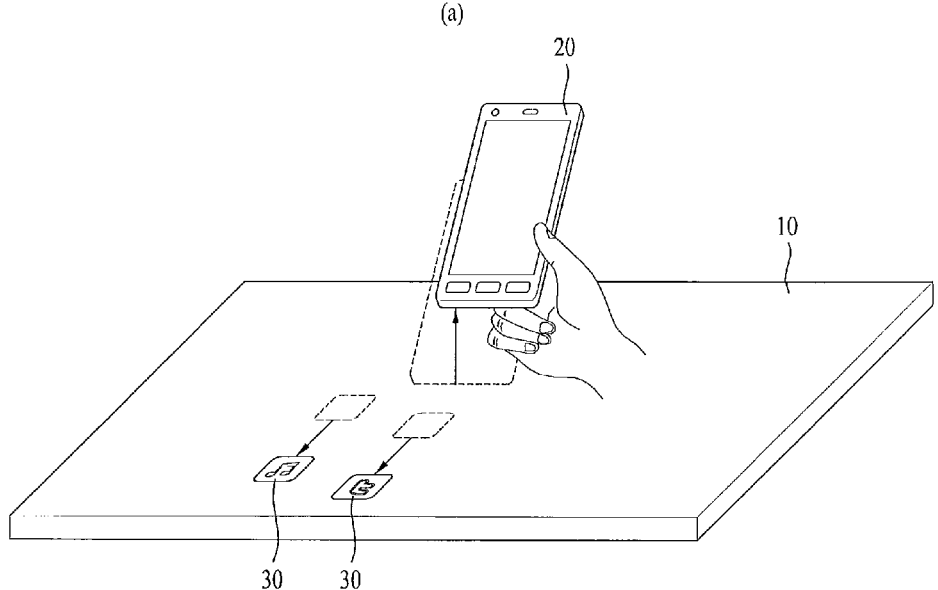

FIGS. 8A and 8B are diagrams illustrating a data display method according to movement of an external device in accordance with an exemplary embodiment of the present invention.

The interactive display device 10 of the present invention may adaptively display data 30 by varying the displayed location of the data 30 according to movement of the external device 20. If three-dimensional information of the external device 20 detected by the interactive display device 10 is changed, the interactive display device 10 may vary the displayed location of the data 30 by changed coordinates. For example, if the three-dimensional coordinate information of the external device 20 is shifted by 20 pixels to the left, the interactive display device 10 may display the data 30, the location of which is shifted by 20 pixels to the left. The interactive display device 10 may display the data 30 in consideration of the movement distance and movement direction of the external device 20 on the surface thereof and the direction in which the front side of the external device 20 faces.

In FIGS. 8A and 8B, the z-axis coordinate of the external device 20, i.e. the height is shifted on the interactive display device 10. In FIG. 8A, the external device 20 may be present on the surface of the interactive display device 10. The interactive display device 10 may determine the x, y, z coordinates of the external device 20 on the surface of the interactive display device 10 and determine an angle between the external device 20 and the surface of the interactive display device 10 and direction in which the front side of the external device 20 faces. The interactive display device 10 may adaptively display the data 30 according to determined information.

If the location of the external device 20 is changed as shown in FIG. 8B, the interactive display device 10 may detect the changed location. As described above, if the coordinates on the x-y plane of the external device 20 are changed, the interactive display device 10 may display the data 30 by shifting the data 30 by the changed coordinates of the external device 20.

If the coordinates of the external device 20 are shifted in a z-axis direction, the interactive display device 10 may display data 30 shifted by a distance proportional to the shifted length. If the external device 20 is shifted in a positive z-axis direction, the displayed direction of the data may be a direction in which the front side of the external device 20 faces. Alternatively, the interactive display device 10 may detect a direction in which a user who shifts the external device 20 is located and shift the data in the detected direction. If the location of the external device 20 is shifted again in a negative z-axis direction, the displayed location of the data 30 may be restored to the original location in the proximity of the external device 20 as shown in FIG. 8A.

As mentioned above, the interactive display device 10 according to the present invention can increase convenience of manipulation by providing a user with the adaptively displayed data shifted according to the distance from the external device 20.

Figure 9:
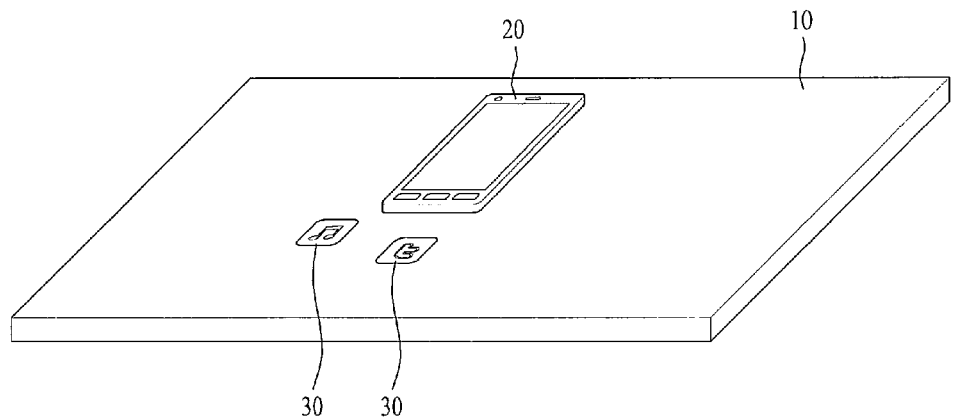
FIGS. 9A and 9B are diagrams illustrating a data display method according to angle variation of an external device in accordance with an exemplary embodiment of the present invention.
Figure 9:
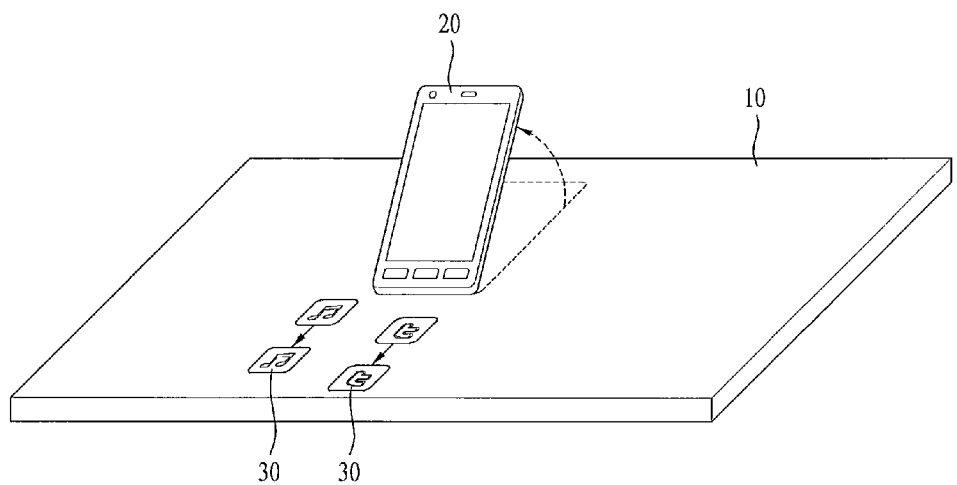

FIGS. 9A and 9B are diagrams illustrating a data display method according to angle variation of an external device in accordance with an exemplary embodiment of the present invention.

The interactive display device 10 of the present invention may adaptively display data 30 by changing the displayed location of the data 30 according to an angle between the surface thereof and the external device 20. If angle information of the external device 20 detected by the interactive display device 10 is changed, the interactive display device 10 may change the displayed location of the data 30 by the changed angle.

As shown in FIG. 9A, the external device 20 may be located in parallel on the surface of the interactive display device 10. The interactive display device 10 may determine the x, y, z coordinates on the surface of the interactive display device 10 and determine an angle between the external device 20 and the surface of the interactive display device 10 (0 degrees in FIG. 9A) and direction in which the front side of the external device 20. According to the determined information, the interactive display device 10 may adaptively display the data 30.

If the angle between the interactive display device 10 and the external device 20 is changed, the interactive display device 10 may sense and detect the changed angle. The angle determination method has been described with reference to FIGS. 2A to 4C. If the angle between the surface of the interactive display device 10 and the external device 20 is changed, the interactive display device 10 may display data 30, the location of which is shifted by a distance proportional to the changed angle.

If the angle between the surface of the interactive display device 10 and the external device 20 increases, the movement direction of the data may be a direction in which the front side of the external device 20 faces. Alternatively, the interactive display device 10 may detect a direction in which a user shifting the angle of the external device 20 is located to display the data 30 in the user location direction.

If the angle between the surface of the interactive display device 10 and the external device 20 decreases, the displayed location of the data 30 is restored to the direction of the external device 20 and the data 30 may be displayed in the proximity of the external device 20 as shown in FIG. 9A.

As mentioned above, the interactive display device 10 according to the present invention can increase convenience of manipulation by providing a user with the adaptively displayed data shifted according to the angle between the surface of the interactive display device 10 and the external device 20.

Figure 10:
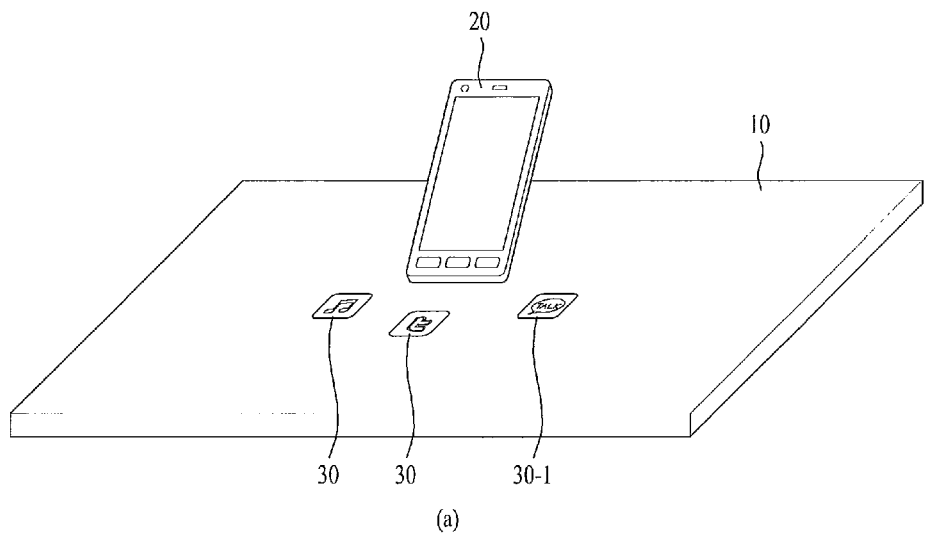
FIGS. 10A and 10B are diagrams illustrating a location varying method of displayed data according to an exemplary embodiment of the present invention.
Figure 10:
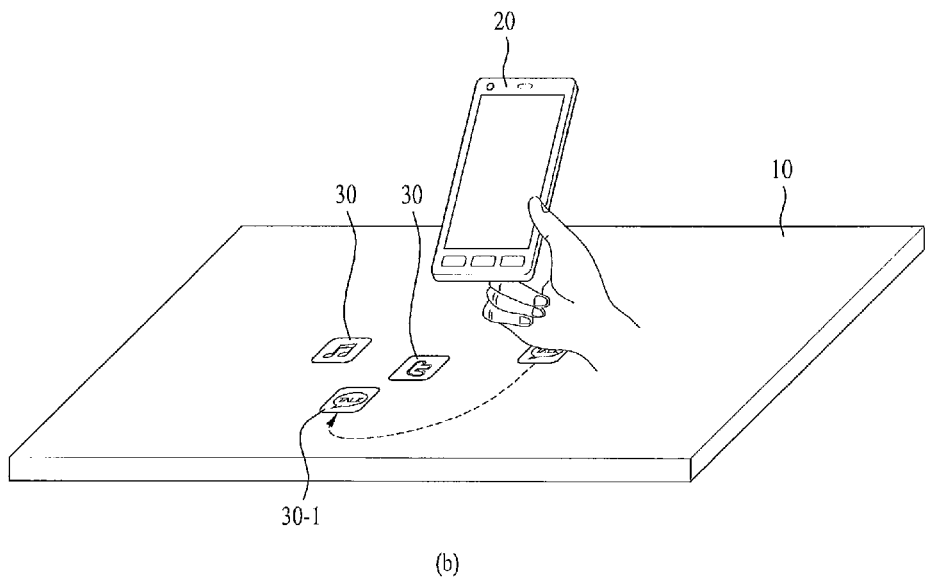

FIGS. 10A and 10B are diagrams illustrating a location varying method of displayed data according to an exemplary embodiment of the present invention.

If a specific object is placed in a displayed area of the data 30 such that a user cannot view the data 30, the interactive display device 10 may adaptively display the data through data location change.

The external device 20 may be placed on the surface of the interactive display device 10 as shown in FIG. 10A. The interactive display device 10 may determine the x, y, and z coordinates of the external device 20 on the surface of the interactive display device 10, and determine an angle between the external device 20 and the surface of the interactive display device 10 and the direction in which the front side of the external device 20 faces. The interactive display device 10 may adaptively display the data 30 and 30-1 according to determined information.

If the data 30-1 displayed on the interactive display device 10 is hidden by a specific object such as the user's hand, the interactive display device 10 may detect the specific object and the hidden area. The interactive display device 10 may detect the data 30-1 located in an area hidden by the specific object of the data 30 and 30-1 through pixel sensors and display the data 30-1 in a changed area. The interactive display device 10 may display the data 30-1 in an area except for the hidden area or in an area that the user can see. In addition, the interactive display device 10 may further consider the displayed location of other data 30 and the location of the external device 20 on the interactive display device 10 so that the corresponding data 30-1 can be displayed.

Figure 11:
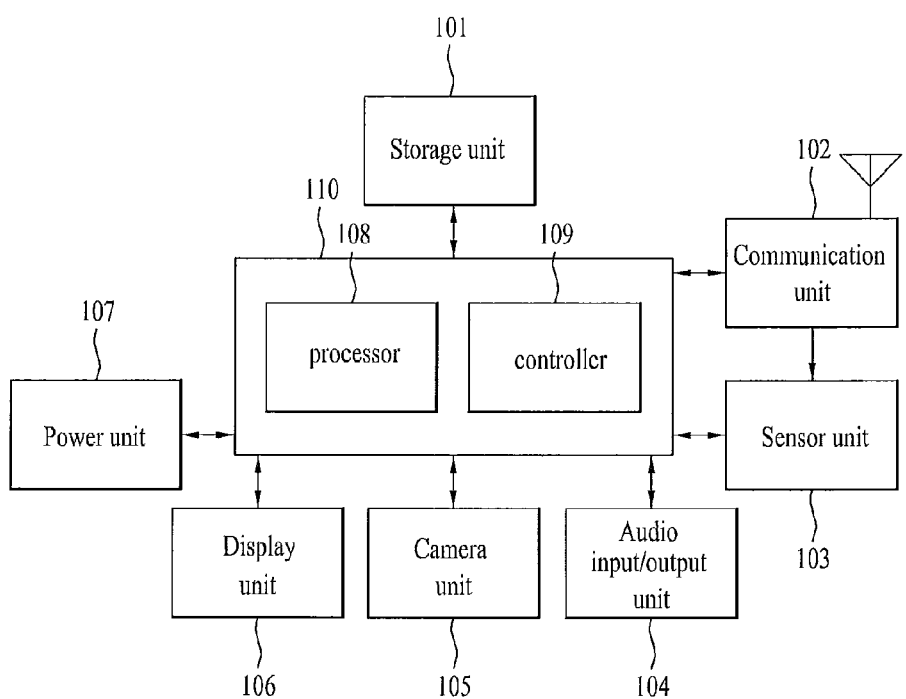
FIG. 11 is a block diagram illustrating an interactive display device according to an exemplary embodiment of the present invention.

FIG. 11 is a block diagram illustrating an interactive display device according to an exemplary embodiment of the present invention.

Referring to FIG. 11, the interactive display device includes a storage unit 101, a communication unit 102, a sensor unit 103, an audio input/output unit 104, a camera unit 105, a display unit 106, a power unit 107, a processor 108, and a controller 109.

The storage unit 101 may store a variety of digital data such as video, audio, pictures, and moving images. The storage unit 101 indicates various digital data storage spaces such as a flash memory, a Hard Disk Drive (HDD), and a Solid State Drive (SSD). Upon detecting an external device, the interactive display device of the present invention may display data stored in the storage unit 101 in consideration of the location of the external device on the surface of the interactive display device. The storage unit 101 is optional according to design of the interactive display device.

The communication unit 102 may transmit and receive data by performing communication using various protocols with an external network of the interactive display device. The communication unit 102 may transmit and receive digital data by accessing the external network by wire or wirelessly.

The sensor unit 103 may transmit user input or an environment recognized by the interactive display device to the controller 109 by using a plurality of sensors installed in the interactive display device. The sensor unit 103 may include a plurality of sensing means. As an embodiment, the plurality of sensing means may include a gravity sensor, a geomagnetic sensor, a motion sensor, a gyro sensor, an acceleration sensor, an inclination sensor, a brightness sensor, an altitude sensor, an odor sensor, a temperature sensor, a depth sensor, a pressure sensor, a bending sensor, an audio sensor, a video sensor, a Global Positioning System (GPS) sensor, a touch sensor, a pixel sensor, an identification sensor, etc. In the present invention, the sensor unit 103 may sense the shape of the external device using the pixel sensors or sense a signal generated by the identification marker of the external device using the identification marker sensors. The sensing unit 103 may transmit the sensed shape or signal to the controller 109. The identification marker sensor may include at least one of a magnetic field sensor, an infrared sensor, a visual light sensor, and an ultrasonic sensor. The identification marker sensor may sense at least one of magnetic field, infrared light, visible light, and ultrasonic waves and convert the sensed signal into digital data.

The above-described pixel sensors and the identification marker sensors may be positioned in all regions of the display unit 106. The sensor unit 103 collectively refers to the above various sensing means and may transmit a sensed result after sensing various shapes of the external devices and signals of identification markers, so that the interactive display device can perform an operation according to the sensed result. The above-mentioned sensors may be included in the interactive display device as separate elements or may be incorporated into at least one element.

The audio input/output unit 104 may include an audio output means such as a speaker and an audio input means such as a microphone and may perform audio output of the interactive display device and audio input to the interactive display device. The audio input/output unit 104 may be used as an audio sensor. In the interactive display device of the present invention, the audio input/output unit is an optional element.

The camera unit 105 may capture pictures and moving images and may be an optional element according to embodiments. The camera unit 105 may be used as a motion sensor or a visual sensor. In the present invention, the camera unit 105 may detect the shape of the external device as in the aforementioned pixel sensor. In the interactive display device of the present invention, the camera unit 105 is optional.

The display unit 106 may output images on a display screen. In the case of a touch sensitive display, the display unit 106 may be used as the above-mentioned touch sensor. The display unit 106 may detect user input and transmit the detected user input to the controller 109. The display unit 106 may display images on a display panel or control image display. In the present invention, the display unit 106 may display at least one of data stored in the interactive display device, data stored in the external device, or data received from a network on a region adjacent to the detected external device. The display unit 106 may include a flexible display.

The power unit 107 is a power source connected to a battery within the interactive display device or to an external power source and may supply power to the interactive display device. In the interactive display device of the present invention, the power unit may be an optional element.

The processor 108 may execute various applications stored in the storage unit 101 and process data of the interior of the interactive display device.

The controller 109 may control the above-described units and manage data transmission and reception between the units.

The processor 108 and the controller 109 may be incorporated into one chip 110 to perform the above operation. In this case, they may be referred to as the controller 109. In the present invention, the controller 109 may detect an external device placed on the surface of the interactive display device. The controller 109 may receive a sensed result for the external device, detected from the pixel sensors and the identification marker sensors, and determine the location, angle, and direction of the external device on the surface of the interactive display device. In addition, since the controller 109 has different sensed results according to rotation angles of the external device 20, the controller 109 may measure the rotation angles of the external device or determine contact information. The controller 109 may measure the rotation angles or determine contact information based on the length of an image sensed by the pixel sensors and the location of the sensed signal of the identification marker on the sensed image.

The controller 109 may display data on the display unit 106 based on the determined information.

FIG. 11 is a block diagram of the interactive display device according to an exemplary embodiment of the present invention and separate blocks show logically distinguished elements of the interactive display device. Accordingly, the elements of the device may be incorporated into one chip or multiple chips according to design of the device.

Figure 12:
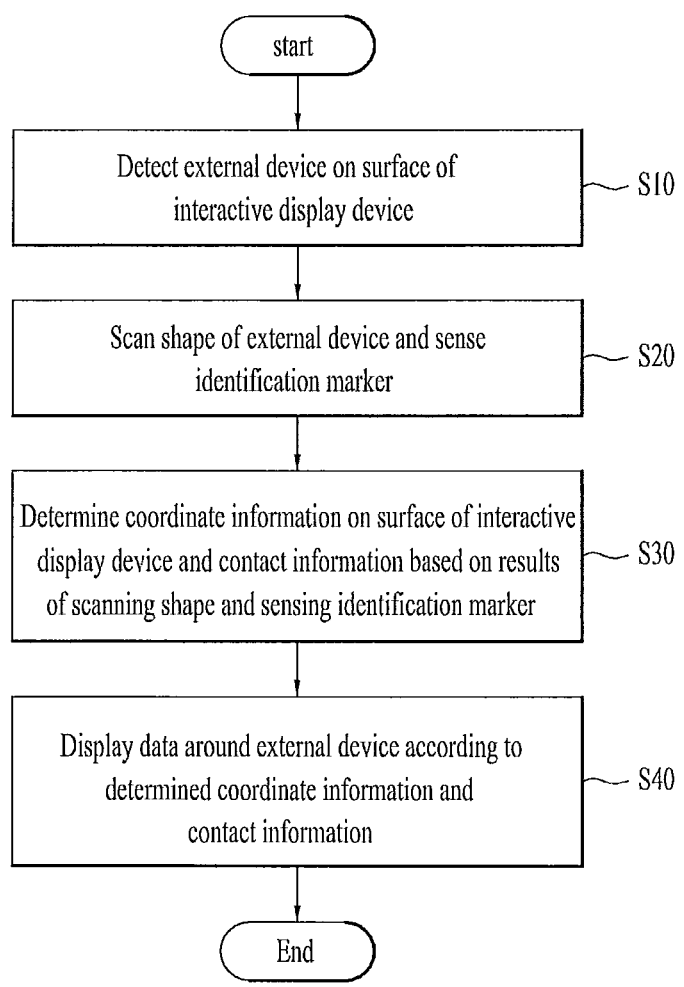
FIG. 12 is a flowchart illustrating a data display method of an interactive display device according to an exemplary embodiment of the present invention.

FIG. 12 is a flowchart illustrating a data display method of an interactive display device according to an exemplary embodiment of the present invention.

The interactive display device according to the present invention may detect an external device on the surface thereof (step S10). The interactive display device may detect the external device using at least ones of pixel sensors and identification marker sensors as described with reference to FIGS. 1A and 1B. Upon detecting the external device, the interactive display device may use at least one of an image variation sensed by the pixel sensors and a signal variation of an identification marker sensed by the identification marker sensors.

The interactive display device may prevent detection malfunction caused by an object other than the external device. If a specific object is placed on the surface of the interactive display device for a preset time or more after the aforementioned image variation or the signal variation of the identification marker occurs, the interactive display device completes detection and may trigger the next step S20.

If the presence of the external device is recognized, the interactive display device may scan the shape of the external device and sense the identification marker (step S20).

The interactive display device may scan the shape of the external device as described with reference to FIG. 2A to 4C.

The interactive display device may use the pixel sensors to scan the shape of the external device. The pixel sensors may convert the distance between the surface of the interactive display device and the external device into a brightness ratio and express the distance as an image. That is, the interactive display device may generate an image having different brightness ratios according to the distance from the external device.

The interactive display device may sense signals generated by the identification markers of the external device as described with reference to FIGS. 2A to 4C. The interactive display device may sense signals generated by a plurality of identification markers using the identification marker sensors and transfer the sensed result to the controller. The interactive display device may also sense signal patterns formed by the strengths and generation intervals of the signals of the identification markers.

The order of scanning of the shape of the external device and sensing the identification markers may be changed according to embodiments. In other words, the interactive display device may scan the shape of the external device after sensing the identification markers.

The interactive display device may process the result of sensing the image received from the pixel sensors and the signals of the identification markers sensed by the identification marker sensors, using the controller as described with reference to FIGS. 2A to 6C. The interactive display device may determine three-dimensional coordinate information of the external device on the surface of the interactive display device, an angle between the external device and the interactive display device display, direction of the front side of the external device, and contact information of the external device (step S30). The contact information indicates which side of the external device is in contact with the interactive display device.

The controller may determine the distance up to the external device including the identification markers using the strength of the signals of the identification markers as described with reference to FIGS. 2A to 4C and recognize signal patterns of the identification markers using the strength, direction, occurrence length, and occurrence period of the signals of the identification markers. The interactive display device may receive data for the external device through the recognized signal patterns. The data for the external device may include at least one of a serial number, a model number, a MAC address, a manufacturer, user information, and service provider information of the external device.

The interactive display device may display data in the proximity of the external device based on the determined information as explained in association with FIG. 8A to 10B (step S40). If the determined information is changed, the interactive display device may detect the changed information to display data according to the changed information.

For example, if the angle between the surface of the interactive display device and the external device is changed, the displayed location of data may be changed. If the angle increases, the interactive display device may recognize that a user uses the external device and change the displayed data in the direction in which the user is located or in the direction in which the front side of the external device faces. And then, if the angle decreases, the interactive display device may recognize that the user stops using the external device and restore the data back to the location of the external device.

If an obstacle is sensed in an area on which data is displayed, since it may be impossible to normally provide data to a position of a user view, the interactive display device may display the data in an area which is not hidden by the obstacle.

If the sensed shape of the external device or the sensed signal of the identification marker is sensed no longer, the interactive display device may not display data any more. In this case, a triggering time may be set so that data is not displayed only when the shape of the external device or the signal of the identification marker is not sensed for a preset time or more.

According to the present invention, 3-dimensional coordinate information of an external device on the surface of an interactive display device, an angle between the interactive display device and the external device, and direction of the front side of the external device can be determined.

According to the present invention, the location of the external device is recognized so that related data can be displayed around the recognized external device.

According to the present invention, the direction of the front side of the external device is recognized so that related data can be displayed in the direction in which the external device is directed.

According to the present invention, if a plurality of external devices is present, each of the external devices is recognized so as to display data for each external device.

According to the present invention, the displayed location of data can be adaptively changed according to an angle between the external device and the interactive display device so that a convenient user interface is provided.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling an interactive display device, the method comprising:
    detecting an external device on a surface of the interactive display device, wherein the external device includes a plurality of identification markers sensed by the interactive display device;
    scanning a shape of the external device;
    sensing signals of the identification markers;
    determining coordinate information and contact information of the external device on the surface of the interactive display device based on a result of scanning the shape and sensing the signals, wherein the contact information indicates which side of the external device is in contact with the interactive display device; and
    displaying data around the external device according to the determined coordinate information and contact information,
    wherein a result of scanning the shape of the external device is an image including a gradation region,
    wherein a tilt angle of the external device is determined according to a brightness ratio of the gradation region, and
    wherein a direction of the external device is determined according to a direction of the gradation region.

2. The method of claim 1, further comprising:
    recognizing signal patterns of the identification markers of the external device, wherein the signal patterns are generated by state variations of the signals of the identification markers; and
    receiving data for the external device by the recognized signal patterns.

3. The method of claim 2, wherein the data for the external device includes at least one of a serial number, a model number, a MAC address, a manufacturer, user information, and service provider information of the external device.

4. The method of claim 2, wherein recognizing signal patterns of the identification markers further comprises detecting the signal patterns of the identification markers generated by the identification markers, wherein the signal patterns are generated by three identification markers generating the same signal pattern or by two identification markers generating different signal patterns.

5. The method of claim 2, further comprising, if a plurality of external devices is present on the surface of the interactive display device:
   recognizing signal patterns generated by identification markers of each of the plurality of external devices; and
   identifying each of the plurality of external devices by the recognized identification patterns.

6. The method of claim 1, wherein the coordinate information includes at least one of a location of the external device on the surface of the interactive display device, an angle between the external device and the interactive display device, and a direction in which a front side of the external device faces.

7. The method of claim 1, wherein the identification markers include at least one of a magnetic field source, an infrared source, a luminous source, and an ultrasonic wave source.

8. The method of claim 1, wherein the displayed data is data extracted from the external device or the interactive display device.

9. The method of claim 1, wherein displaying data further comprises:
   detecting a variation of the coordinate information or contact information; and
   shifting the displayed data in a front direction of the external device in proportion to a varied angle between the external device and the interactive display device.

10. The method of claim 1, further comprising, if a data displayed part is hidden by an object on the surface of the interactive display device,
    detecting a hidden part of the displayed data; and
    displaying the displayed data in a region included in a user view range.

11. An interactive display device comprising:
    a pixel sensor unit configured to scan a shape of an external device;
    an identification marker sensor unit configured to sense a signal of an identification marker;
    a display unit configured to display data; and
    a controller, configured to:
    detect the external device on the display unit, wherein the external device includes a plurality of identification markers sensed by the identification marker sensor unit,
    scan a shape of the external device,
    sense signals of the identification markers,
    determine coordinate information and contact information of the external device on the display unit based on a result of scanning the shape and sensing the signals, wherein the contact information indicates which side of the external device is in contact with the interactive display device, and
    display data around the external device according to the determined coordinate information and contact information,
    wherein a result of scanning the shape of the external device is an image including a gradation region,
    wherein a tilt angle of the external device is determined according to a brightness ratio of the gradation region, and
    wherein a direction of the external device is determined according to a direction of the gradation region.

12. The interactive display device of claim 11, wherein the controller is further configured to:
    recognize signal patterns of the identification markers of the external device, wherein the signal patterns are generated by state variations of the signals of the identification markers; and
    receive data for the external device by the recognized signal patterns.

13. The interactive display device of claim 12, wherein the data for the external device includes at least one of a serial number, a model number, a MAC address, a manufacturer, user information, and service provider information of the external device.

14. The interactive display device of claim 12, wherein the controller is further configured to detect the signal patterns of the identification markers generated by the identification markers, and
    wherein the signal patterns are generated by three identification markers generating the same signal pattern or by two identification markers generating different signal patterns.

15. The interactive display device of claim 12, wherein, if a plurality of external devices is present on the display unit, the controller is further configured to:
    recognize signal patterns generated by identification markers of each of the plurality of external devices; and
    identify each of the plurality of external devices by the recognized identification patterns.

16. The interactive display device of claim 11, wherein the coordinate information includes at least one of a location of the external device on the display unit, an angle between the external device and the display unit, and a direction in which a front side of the external device faces.

17. The interactive display device of claim 11, wherein the identification markers include at least one of a magnetic field source, an infrared source, a luminous source, and an ultrasonic wave source.

18. The interactive display device of claim 11, wherein the displayed data is data extracted from the external device or the interactive display device.

19. The interactive display device of claim 11, wherein the controller is further configured to:
    detect a variation of the coordinate information or contact information; and
    shift the displayed data in a front direction of the external device in proportion to a varied angle between the external device and the display unit.

20. The interactive display device of claim 11, wherein, if a data displayed part is hidden by an object on the display unit, the controller is further configured to:
    detect a hidden part of the displayed data; and
    display the displayed data in a region included in a user view range.

* * * * *